(12) United States Patent
Ryu et al.

(10) Patent No.: US 12,301,883 B2
(45) Date of Patent: *May 13, 2025

(54) VIDEO CODING METHOD AND APPARATUS UTILIZING GROUP OF ENCODING UNITS

(71) Applicant: KONINKLIJKE PHILIPS N.V., Eindhoven (NL)

(72) Inventors: Ho Chan Ryu, Seoul (KR); Yong Jo Ahn, Seoul (KR)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/654,328

(22) Filed: May 3, 2024

(65) Prior Publication Data

US 2024/0283982 A1 Aug. 22, 2024

Related U.S. Application Data

(63) Continuation of application No. 18/470,976, filed on Sep. 20, 2023, now Pat. No. 12,003,781, which is a continuation of application No. 18/302,186, filed on Apr. 18, 2023, now Pat. No. 12,143,643, which is a continuation of application No. 17/484,731, filed on Sep. 24, 2021, now Pat. No. 11,659,209, which is a continuation of application No. 16/378,499, filed on
(Continued)

(30) Foreign Application Priority Data

Oct. 13, 2016 (KR) .......................... 10-2016-0132602

(51) Int. Cl.
*H04N 19/176* (2014.01)
*H04N 19/119* (2014.01)
*H04N 19/134* (2014.01)
*H04N 19/169* (2014.01)
*H04N 19/44* (2014.01)
*H04N 19/46* (2014.01)
*H04N 19/70* (2014.01)
*H04N 19/88* (2014.01)
*H04N 19/96* (2014.01)

(52) U.S. Cl.
CPC ........... *H04N 19/70* (2014.11); *H04N 19/119* (2014.11); *H04N 19/134* (2014.11); *H04N 19/169* (2014.11); *H04N 19/176* (2014.11); *H04N 19/44* (2014.11); *H04N 19/46* (2014.11); *H04N 19/88* (2014.11); *H04N 19/96* (2014.11)

(58) Field of Classification Search
CPC ...... H04N 19/96; H04N 19/70; H04N 19/176; H04N 19/119
See application file for complete search history.

(56) References Cited

U.S. PATENT DOCUMENTS

2019/0222843 A1* 7/2019 Lee ................... H04N 19/159

* cited by examiner

*Primary Examiner* — Kyle M Lotfi

(57) ABSTRACT

The present invention relates to a block partitioning structure from among the video coding schemes, and a method and apparatus for encoding and decoding the block partitioning structure. The video encoding and decoding method comprises the steps of: combining two or more encoding units of maximum size into a single encoding unit group; acquiring encoding data corresponding to the combined single encoding unit group; and decoding, according to a decoding order, the two or more encoding units of maximum size contained in the single encoding unit group.

9 Claims, 7 Drawing Sheets

Related U.S. Application Data

Apr. 8, 2019, now Pat. No. 11,159,825, which is a continuation of application No. PCT/KR2016/011524, filed on Oct. 14, 2016.

| group_of_coding_tree_unit () { | Descriptor |
|---|---|
| xGctb = (GctbAddrInRs % PicWidthInCtbY) << GctbLog2SizeY | |
| yGctb = (GctbAddrInRs / PicWidthInCtbY) << GctbLog2SizeY | |
| | |
| if( slice_sao_luma_flag || slice_sao_chroma_flag ) | |
| sao(xGctb >> GctbLog2SizeY, yGctb >> GctbLog2SizeY ) | |
| if( adaptive_gctb_scan_order ) | |
| gctb_scan_order | ae(v) |
| if( adaptive_gctb_star_point ) | |
| gctb_start_point | ae(v) |
| ... | |
| for( i = 0; i < num_ctb_in_group; i++) | |
| coding_tree_unit() | |
| ... | |
| } | |

Fig. 5

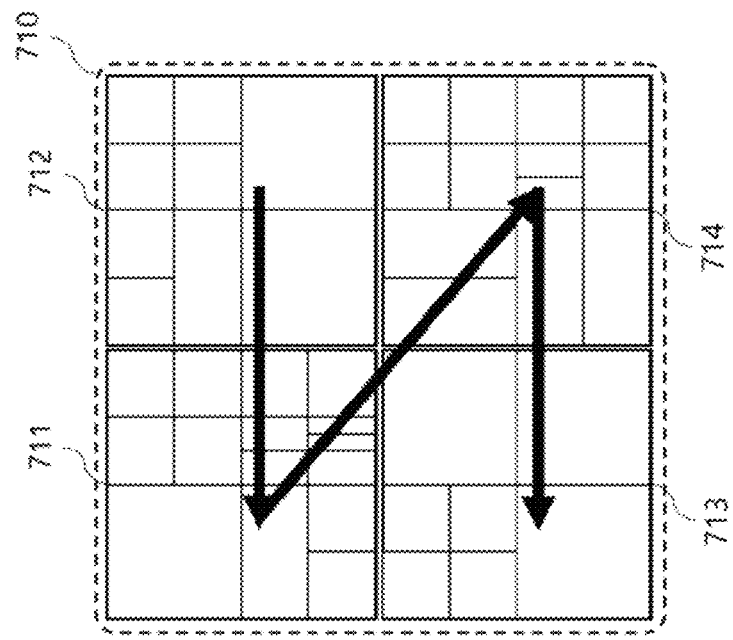
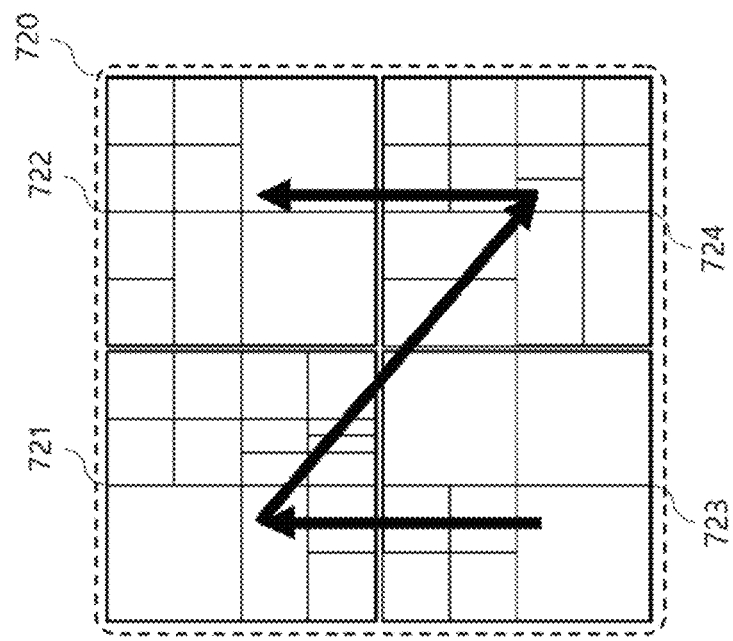
Fig. 7

VIDEO CODING METHOD AND APPARATUS UTILIZING GROUP OF ENCODING UNITS

CROSS REFERENCE TO RELATED APPLICATIONS

This is a continuation of U.S. application Ser. No. 18/470,976 filed Sep. 20, 2023, which is a continuation of U.S. application Ser. No. 18/302,186 filed Apr. 18, 2023, which is a continuation of U.S. application Ser. No. 17/484,731 filed Sep. 24, 2021, which is a continuation of U.S. application Ser. No. 16/378,499, filed Apr. 8, 2019, which is a continuation application of the International Patent Application Serial No. PCT/KR2016/011524, filed Oct. 14, 2016, which claims priority to the Korean Patent Application Serial No. 10-2016-0132602, filed Oct. 13, 2016. Both of these applications are incorporated by reference herein in their entireties.

TECHNICAL FIELD

The present invention relates to an image processing scheme and, more particularly, to a method and apparatus for describing a block partitioning structure and a syntax on the block partitioning structure in a bitstream in a video compression scheme.

BACKGROUND ART

The demand for multimedia data is increasing due to diversification and miniaturization of multimedia devices, and thus there has been a need for a high efficiency video compression technology for next generation video services. Based on such a need, the MPEG and VCEG jointly established the Joint Collaborative Team on Video Coding (JCT-VC) of the video compression standardization of H.264/AVC, and established in January 2013 the standardization for HEVC, which is the latest international video compression standard. In addition, the MPEG and VCEG jointly standardized various HEVC extensions, and established the Joint Video Exploration Team (JVET) in 2015 to research the next generation video compression standards after HEVC.

In the video compression technology, a block partitioning structure refers to a unit in which encoding and decoding are performed, and a unit to which main encoding and decoding technologies such as prediction and transform are applied. As the video compression technology develops, the magnitude of blocks for performing encoding and decoding is gradually increasing, and in terms of block partitioning forms, more various partitioning forms are supported. In addition, the video compression is performed using units subdivided according to roles of blocks as well as units for performing encoding and decoding. In the HEVC standard, video coding and decoding are performed using unit blocks subdivided according to a block partitioning structure of quad-tree type and roles of prediction and transform. In addition, various forms of block partitioning structures such as a Quad-Tree plus Binary-Tree (QTBT) which is a form of a combination of a quad-tree and a binary-tree, a block partitioning structure of any form, and the like have been proposed for improving video encoding efficiency. In block structures having various block depths from block sizes of 128×128, 256×256, and the like to a block size of 8×8, the number of bits used for expressing block structures of various sizes and types or for representing a lot of block data is greatly increasing.

DISCLOSURE

Technical Problem

It is an object of the present invention to provide a method and an apparatus capable of improving encoding efficiency compared to the existing video compression schemes by which one or more encoding blocks are combined into a group and then encoded.

However, the technical problem to be solved by this embodiment is not limited to the above-described technical problems, and other technical problems may exist.

Technical Solution

In order to achieve the objects, video encoding and decoding method and apparatus according to an embodiment of the present invention includes a combiner for combining two or more encoding units of maximum size into a single encoding unit group; an acquirer for acquiring encoding information corresponding to the single encoding unit group; and a decoder for performing decoding on the two or more encoding units of maximum size included in the single encoding unit group according to a decoding order.

In order to achieve the objects, according to an embodiment of the present invention, the combiner for combining the two or more encoding units of maximum size into a single encoding unit group includes: a determiner for determining whether the encoding unit group is used or not; a determiner for determining the number of encoding units of maximum size to be included in the encoding unit group; and a determiner for determining the decoding order of the encoding units of maximum size to be included in the encoding unit group.

In order to achieve the objects, according to an embodiment of the present invention, the acquirer for acquiring the encoding information corresponding to the single encoding unit group includes: an acquirer for acquiring a syntax to be applied to the encoding unit group; an acquirer for acquiring encoding information commonly applied to the two or more encoding units of maximum size included in the encoding unit group using the acquired syntax information; and a storage for storing the encoding information commonly applied to the two or more encoding units of maximum size included in the encoding unit group.

In order to achieve the objects, according to an embodiment of the present invention, the decoder for performing decoding on the two or more encoding units of maximum size included in the single encoding unit group according to the decoding order includes: an acquirer for acquiring the decoding order for the two or more encoding units of maximum size included in the single encoding unit group; and a decoder for performing decoding on the encoding units of maximum size according to the acquired decoding order.

Advantageous Effects

It is an object of the present invention to provide a video coding method and apparatus for efficiently representing and encoding information of partitioned encoding blocks in video coding method and apparatus using a block structure of various sizes and shapes to improve the encoding efficiency.

According to an embodiment of the present invention, information of one or more encoding blocks is combined into one or more groups and then encoded, thereby improving the encoding performance.

DESCRIPTION OF DRAWINGS

FIG. 5 is a view illustrating an example of syntax for each encoding unit group in which a plurality of encoding units are combined into a single group according to an embodiment of the present invention.

FIG. 7 is a view illustrating an example of a decoding order of each encoding unit in a encoding unit group according to an embodiment of the present invention.

BEST MODE

Figure 1:
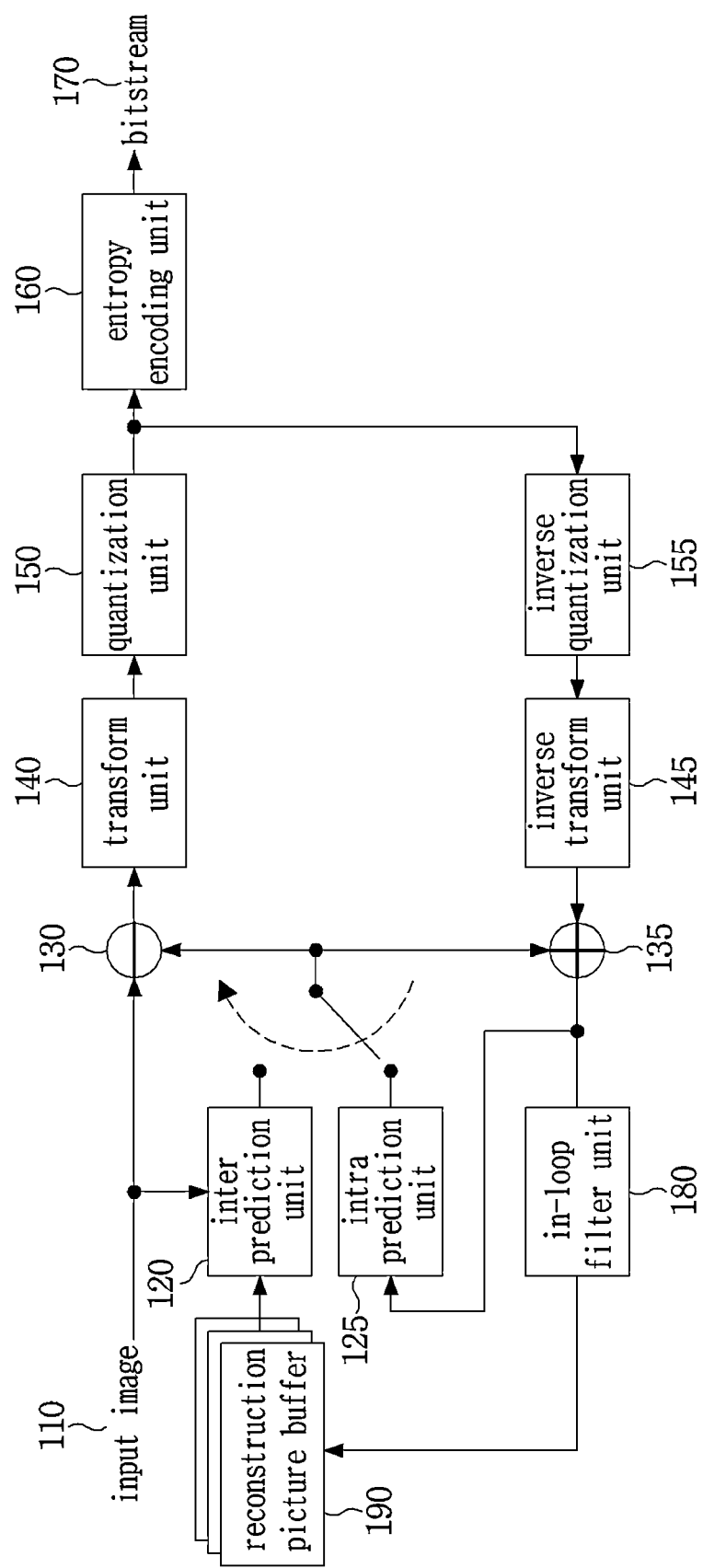
FIG. 1 is a block diagram illustrating a configuration of a video encoding apparatus according to an embodiment of the present invention.

Hereinafter, embodiments of the present invention will be described in detail with reference to the drawings attached thereto, so that those skilled in the art can easily carry out the present invention. The present invention may, however, be embodied in many different forms and should not be construed as limited to the embodiments set forth herein. In order to clearly illustrate the present invention, parts not related to the description are omitted, and similar parts are denoted by like reference characters throughout the specification.

Throughout this specification, when a part is referred to as being 'connected' to another part, it includes not only an example where they are directly connected but also an example where the part is electrically connected with another part in between.

In addition, when a part is referred to as 'comprising' an element throughout the specification, it is understood that the element may include other elements as well, without departing from the other elements unless specifically stated otherwise.

The term 'a step of doing something' or 'a step of something' used throughout this specification does not mean a step for something.

Also, the terms first, second, etc. may be used to describe various components, but the components should not be limited by the terms. The terms are used only for the purpose of distinguishing one component from another.

In addition, the components shown in the embodiments of the present invention are shown independently to represent different characteristic functions, but that does not mean that each component consists of separate hardware or one software constituent unit. That is, each component is described by arranging each component for convenience of explanation, and at least two components of components may be combined to form one component or one component may be partitioned into a plurality of components to perform functions. The integrated embodiments and the separate embodiments of each of these components are also included in the scope of the present invention without departing from the essence of the present invention.

In the various embodiments of the present invention described herein below, the color format refers to a form of color components constituting one picture, and the encoding block or encoding unit may be collectively referred to as including a single block or unit in which encoding and decoding are performed in video coding. The color format is not limited to a YUV format, and may be collectively referred to as including all kinds of a plurality of color formats according to color components for constituting one picture.

Hereinafter, a video coding method and apparatus utilizing a combination of diverse block partitioning structures proposed according to an embodiment of the present invention will be described in detail with reference to FIG. 4.

Figure 4:
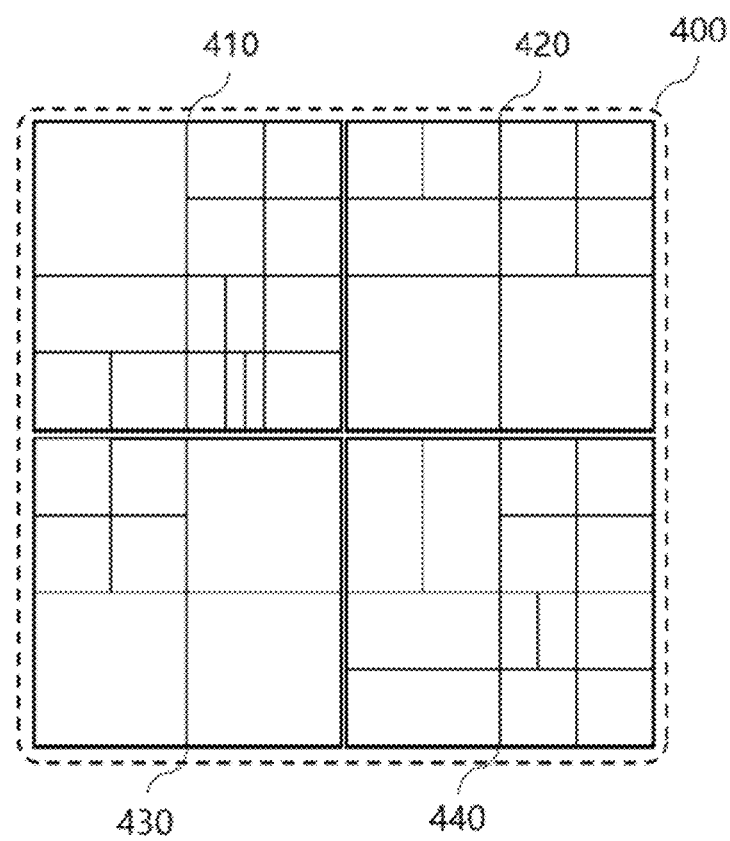
FIG. 4 is a conceptual diagram illustrating a single encoding unit group in which a plurality of encoding units are combined into a single group according to an embodiment of the present invention.

FIG. 4 is a conceptual diagram illustrating a single encoding unit group in which a plurality of encoding units are combined into a single group according to an embodiment of the present invention.

The video coding method and apparatus according to an embodiment of the present invention may use a encoding unit group 400 obtained by combining two or more encoding units 410, 420, 430, and 440 of maximum size into one group to combine a plurality of encoding units into one group. The encoding unit group 400 according to an embodiment of the present invention illustrated in FIG. 5 includes a first encoding unit 410 of maximum size, a second encoding unit 420 of maximum size, a third encoding unit 430 of maximum size, and a forth encoding unit 440 of maximum size.

A encoding unit group 440 according to an embodiment of the present invention shares encoding information commonly applied to encoding units of maximum size included in a corresponding group. The encoding information commonly applied to the encoding units of maximum size included in the group may include Sample Adaptive Offset (SAO) information, Adaptive Loop Filter (ALF) information, Quantization Parameter (QP), and the like. Also, a decoding order of the encoding units of maximum size included in the encoding unit group 440 may be designated. In addition, the location of the encoding unit of maximum size to be initially decoded in the group may be selected with respect to the decoding order of the encoding units of maximum size included in the encoding unit group 440.

MODE FOR INVENTION

Hereinafter, embodiments of the present invention will be described in detail with reference to the drawings attached thereto, so that those skilled in the art can easily carry out the present invention. The present invention may, however, be embodied in many different forms and should not be construed as limited to the embodiments set forth herein. In order to clearly illustrate the present invention, parts not related to the description are omitted, and similar parts are denoted by like reference characters throughout the specification.

Throughout this specification, when a part is referred to as being 'connected' to another part, it includes not only an example where they are directly connected but also an example where the part is electrically connected with another part in between.

In addition, when a part is referred to as 'comprising' an element throughout the specification, it is understood that the element may include other elements as well, without departing from the other elements unless specifically stated otherwise.

The term 'a step of doing something' or 'a step of something' used throughout this specification does not mean a step for something.

Also, the terms first, second, etc. may be used to describe various components, but the components should not be limited by the terms. The terms are used only for the purpose of distinguishing one component from another.

In addition, the components shown in the embodiments of the present invention are shown independently to represent different characteristic functions, and that does not mean that each component consists of separate hardware or one software constituent unit. That is, each component is described by arranging each component for convenience of explanation, and at least two components of components may be combined to form one component or one component may be partitioned into a plurality of components to perform functions. The integrated embodiments and the separate embodiments of each of these components are also included in the scope of the present invention without departing from the essence of the present invention.

In the various embodiments of the present invention described herein below, the color format refers to a form of color components constituting one picture, and the encoding block or encoding unit may be collectively referred to as including a single block or unit in which encoding and decoding are performed in video coding. The color format is not limited to a YUV format, and may be collectively referred to as including all kinds of a plurality of color formats according to color components for constituting one picture.

Hereinafter, a video coding method and apparatus utilizing a combination of diverse block partitioning structures proposed according to an embodiment of the present invention will be described in detail with reference to FIG. 4.

FIG. 1 is a block diagram illustrating a configuration of video encoding method and apparatus according to an embodiment of the present invention.

Video encoding method and apparatus according to an embodiment of the present invention may include an inter prediction unit 120, an intra prediction unit 125, a subtraction unit 130, a transform unit 140, a quantization unit 150, an entropy encoding unit 160, inverse transform unit 145, an inverse quantization unit 155, an adding unit 135, an in-loop filter unit 180, and a reconstructed picture buffer 190.

The inter prediction unit 120 performs motion prediction by using an input image 110 and a reconstructed image stored in the reconstructed picture buffer 190, thereby generating a prediction signal.

The intra-picture prediction unit 125 performs spatial prediction by using a pixel value of a pre-reconstructed neighboring block that are adjacent to the current block to be encoded, thereby generating a prediction signal.

The subtraction unit 130 uses the input image and the prediction signal generated through the inter prediction unit 120 or the intra-picture prediction unit 125 to generate a residual signal The transform unit 140 and the quantization unit 150 perform transform and quantization on the residual signal generated through the subtraction unit 130 to generate a quantized coefficient.

The entropy encoding unit 160 performs entropy encoding on encoding information such as syntax elements and quantized coefficients defined in the video encoder, thereby outputting the bitstream.

The inverse transform unit 145 and the inverse quantization unit 155 receive the quantized coefficients; and perform inverse quantization and inverse transform in order, thereby generating a reconstructed residual signal.

The adding unit 135 generates a reconstructed signal by using the prediction signal generated through the inter prediction unit 120 or the intra prediction unit 125 and the reconstructed residual signal.

The reconstructed signal is transmitted to the in-loop filter unit 180. The reconstructed picture to which the filtering is applied is stored in the reconstructed picture buffer 190, and may be used as a reference picture in the inter prediction unit 120.

Figure 2:
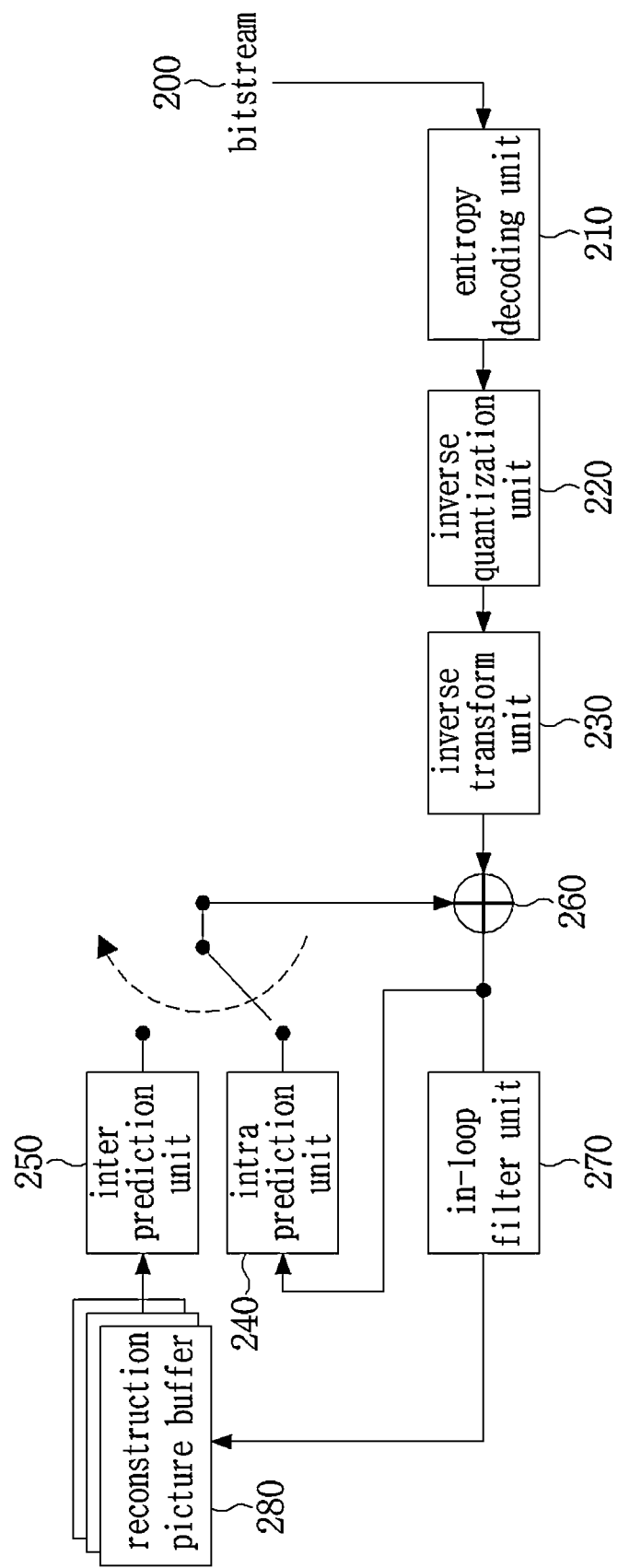
FIG. 2 is a block diagram illustrating a configuration of a video decoding apparatus according to an embodiment of the present invention.

FIG. 2 is a block diagram showing a configuration of video decoding apparatus and method according to an embodiment of the present invention.

The video decoding apparatus and method according to one embodiment includes an entropy decoding unit 210, an inverse quantization unit 220, an inverse transform unit 230, an intra prediction unit 240, an inter prediction unit 250, an adding unit 260, an in-loop filter unit 270, and a reconstructed picture buffer 280.

The entropy decoding unit 210 decodes the input bitstream 200 and outputs decoding information such as syntax elements and quantized coefficients.

The inverse quantization unit 220 and the inverse transform unit 230 receive the quantized coefficients and perform inverse quantization and inverse transform in order, thereby outputting a residual signal.

The intra prediction unit 240 performs spatial prediction by using a pixel value of the pre-reconstructed neighboring block adjacent to the current block to be decoded, thereby generating a prediction signal.

The inter prediction unit 250 performs motion compensation using motion vector extracted from the bitstream and a reconstructed picture stored in the reconstructed picture buffer 280, thereby generating a prediction signal.

The prediction signal output from the intra prediction unit 240 and the inter prediction unit 250 are summed with the residual signal through the adding unit 260, and accordingly the reconstructed signal generated on a per-block basis includes the reconstructed image.

The reconstructed image is transferred to the in-loop filter unit 270. The reconstructed picture to which the filtering is applied is stored in the reconstructed picture buffer 280 and may be used as a reference picture in the inter prediction unit 250.

Figure 3:
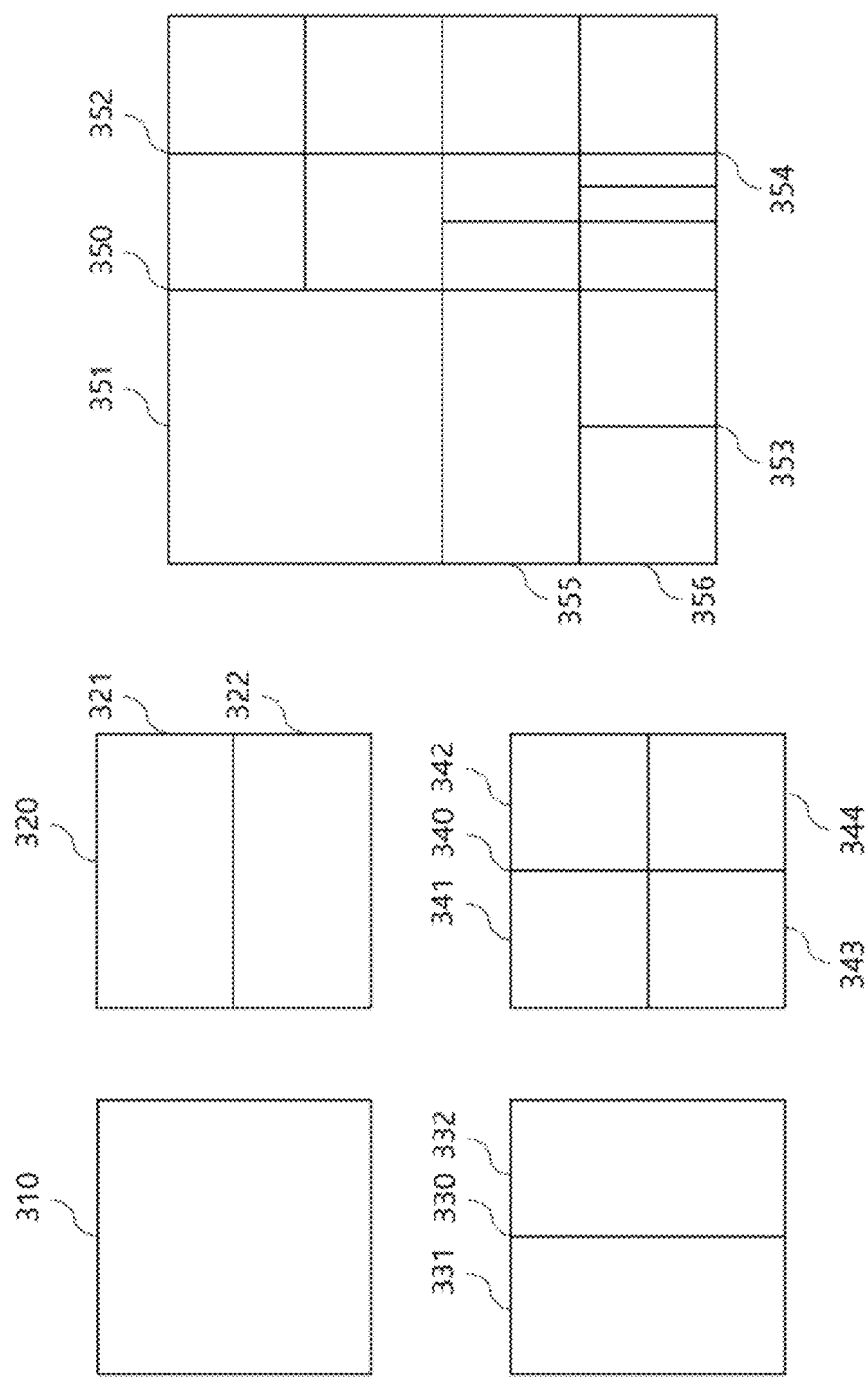
FIG. 3 is a conceptual diagram illustrating diverse types of block partitioning and a block in which diverse block partitioning is combined according to an embodiment of the present invention.

FIG. 3 is a conceptual diagram illustrating diverse types of block partitioning and a block in which diverse block partitioning is combined according to an embodiment of the present invention.

A video coding method and apparatus utilizing a combination of diverse block partitioning structures according to an embodiment of the present invention includes block partitioning forms including a non-partitioned block 310, a horizontally partitioned block 320, a vertically partitioned block 330, quad-partitioned block 340, and a block structure 350 having a form of a combination of diverse block partitioning structures.

According to an embodiment of the present invention, the non-partitioned block 310 includes a form in which one encoding block is not partitioned, and the horizontally partitioned block 320 includes a form in which one encoding block is horizontally partitioned. In addition, according to an embodiment of the present invention, the vertically partitioned block 330 includes a form in which one encoding block is vertically partitioned, and the quad-partitioned block 340 includes a form in which one encoding block is vertically and horizontally partitioned. The one encoding block includes both a square block and a non-square block.

The block structure 350 having a form of a combination of diverse block partitioning structures according to an embodiment of the present invention includes a block structure of a form in which blocks 310, 320, 330, and 340 of diverse block partitioning forms are combined. In the block partitioning structure according to the embodiment, the upper block 350 may be partitioned into four sub-blocks, i.e., a first sub-block 351, a second sub-block 352, a third sub-block 353, and a fourth sub-block 354. The first sub-block 351 according to an embodiment of the present invention is a block represented by the block partitioning form of the block 310 of a non-partitioned form, and the second sub-block 352 is a block represented by block partitioning of the block 340 of a quad-partitioned form. The one encoding block may be partitioned into one or more sub-blocks, and the partitioned sub-blocks may be repeatedly partitioned. The second sub-block 352 is quad-partitioned into four sub-sub-blocks, and each sub-sub-block indicates a block represented by block partitioning of the non-partitioned block 310. The third sub-block 353 is a block represented by the block partitioning of the horizontally partitioned block 320 and the lower end rectangular block 356 of the sub-sub-blocks is a block represented by block partitioning of the vertically partitioned block 330. The fourth sub-block 354 is a block represented by block partitioning of the quad-partitioned block 340, and the first sub-sub-block and the third sub-sub-block of the fourth sub-block are blocks represented by block partitioning of the vertically partitioned block 330. Herein, the third sub-sub-block represents an embodiment in which additional vertical partitioning is performed.

FIG. 5 is a view illustrating an example of syntax for each encoding unit group in which a plurality of encoding units are combined into a single group according to an embodiment of the present invention.

The video coding method and apparatus according to an embodiment of the present invention is provided such that, in order to combine a plurality of encoding unit into a single group and then perform decoding, encoding information which are applied in common to the encoding units of maximum size included in the group, a decoding order of the encoding units of maximum size, and location information of the encoding unit of maximum size to be initially decoded, and the like are included.

The encoding information, which is commonly applied to the encoding units of maximum size included in the group according to an embodiment of the present invention, is obtained by parsing syntax information for each group once on a per-group basis and acquiring the information and is applied in common to all the encoding units of maximum size included in the group. SAO information 510 may be included as an example of syntax for each encoding unit group in which a plurality of encoding units are combined into one group according to an embodiment of the present invention as shown in FIG. 5. The SAO information 510 is commonly applied to all the encoding units of maximum size included in the group, thereby improving encoding efficiency, compared to using SAO information on a per-existing maximum-size encoding unit basis.

The encoding information commonly applied to the encoding units of maximum size included in the group according to an embodiment of the present invention includes a decoding order 530 of the encoding unit of maximum size. Whether a decoding order of the encoding unit of maximum size is used or not 520 is acquired through high-level syntax information, and the high-level syntax information includes a sequence parameter, a picture parameter, and the like. In the case that whether the decoding order of the encoding unit of maximum size is used or not 520 is true, the decoding order of the encoding unit of maximum size is acquired and applied to the decoding 560 of the encoding units of maximum size.

The encoding information commonly applied to the encoding units of the maximum size included in the group according to an embodiment of the present invention includes an initial decoding position 550 of the encoding unit of maximum size. Whether an initial decoding position of the encoding unit of maximum size is used or not 540 is acquired through the high-level syntax information, and the high-level syntax information includes a sequence parameter, a picture parameter, and the like. In the case that whether the initial decoding position of the encoding unit of maximum size is used or not 540 is true, the initial decoding position of the encoding unit of maximum size is acquired and applied to the decoding 560 of the decoding unit of maximum size.

Figure 6:
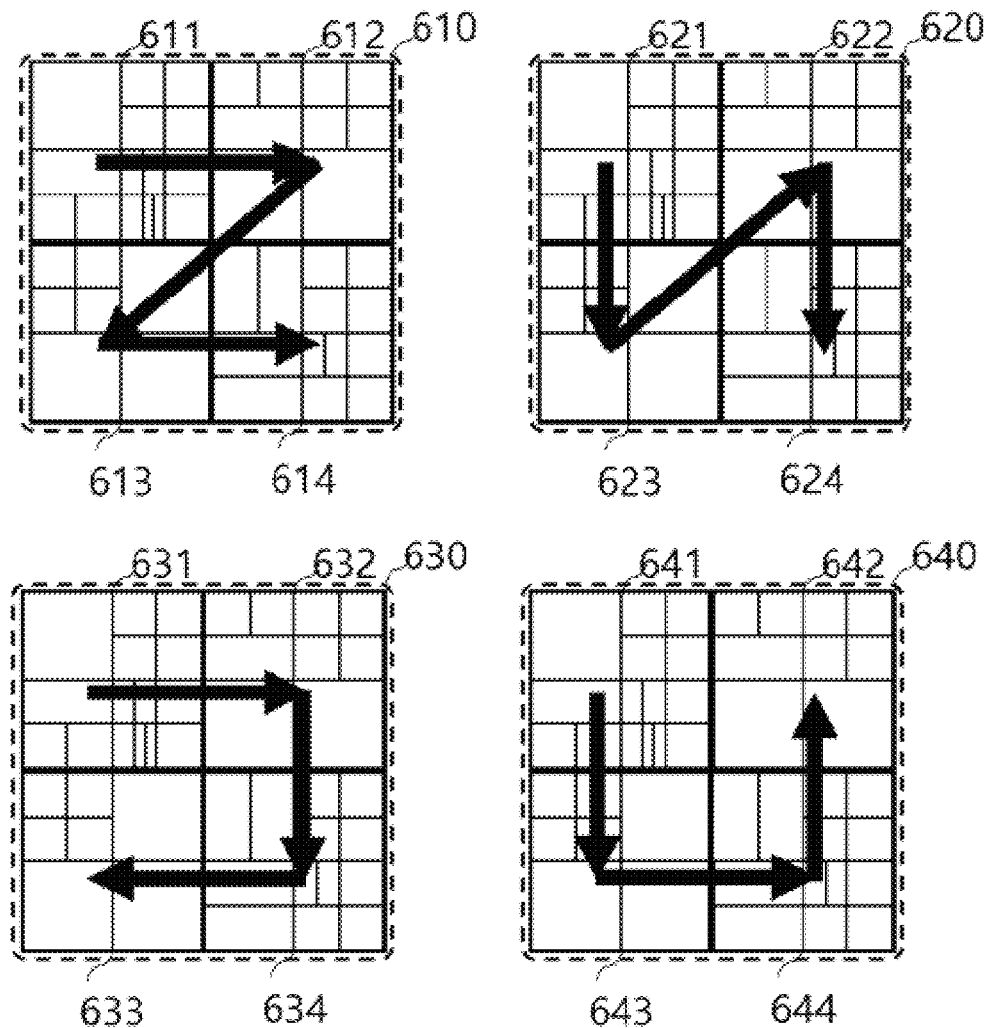
FIG. 6 is a view illustrating an example of a decoding order of each encoding unit in a encoding unit group according to an embodiment of the present invention.

FIG. 6 is a view illustrating an example of a decoding order of each encoding unit in a encoding unit group according to an embodiment of the present invention.

The video coding method and apparatus according to an embodiment of the present invention includes selectively changing the decoding order of each encoding unit in the encoding unit group. The decoding order of each encoding unit in the encoding unit group is performed according to the decoding order 530 of the encoding units of maximum size.

The decoding order 530 of the encoding unit of maximum size according to an embodiment of the present invention includes a decoding order 610 in which the decoding is performed in this order of a first encoding unit 611 of maximum size, a second encoding unit 612 of maximum size, a third encoding unit 613 of maximum size, a fourth encoding unit 614 of maximum size.

The decoding order 530 of the encoding unit of maximum size according to an embodiment of the present invention includes a decoding order 620 in which the decoding is performed in this order of a first encoding unit 621 of maximum size, a third encoding unit 622 of maximum size, a second encoding unit 622 of maximum size, a fourth encoding unit 624 of maximum size.

The decoding order 530 of the encoding unit of maximum size according to an embodiment of the present invention includes a decoding order 630 in which the decoding is performed in this order of a first encoding unit 631 of maximum size, a second encoding unit 632 of maximum size, a fourth encoding unit 634 of maximum size, a third encoding unit 633 of maximum size.

The decoding order 530 of the encoding unit of maximum size according to an embodiment of the present invention includes a decoding order 640 in which the decoding is performed in this order of a first encoding unit 641 of maximum size, a third encoding unit 643 of maximum size, a fourth encoding unit 644 of maximum size, a second encoding unit 642 of maximum size.

FIG. 7 is a view illustrating an example of a decoding order of each encoding unit in a encoding unit group according to an embodiment of the present invention.

The video coding method and apparatus according to an embodiment of the present invention includes selectively changing the initial decoding position in the encoding unit group. The changing of the initial decoding position in the single encoding unit group is performed according to the initial decoding position 550 of the encoding unit of maximum size.

The initial decoding position 550 of the encoding units of maximum size according to an embodiment of the present invention is selected as one of all the encoding units of maximum size in a group including a first encoding unit of maximum size 711, a second encoding unit of maximum size 712, a third encoding unit of maximum size 713, and a fourth encoding unit of maximum size 714. In FIG. 7, as the initial decoding position 550 of the encoding unit of maximum size according to an embodiment of the present invention, there are shown an example 710 in which the second encoding unit 712 of maximum size is selected and an example 720 in which the third encoding unit 723 of maximum size is selected. The first encoding units 711 of maximum size and the fourth encoding units 714 of maximum size may be selected as the initial decoding positions 550 of the encoding unit of maximum size, including the example.

INDUSTRIAL APPLICABILITY

The present invention can be used for broadcasting equipment manufacturing, terminal manufacturing, and the like, and for industries related to source technology.
List Free Text
  No

The invention claimed is:

1. A video decoding method, comprising:
    dividing a first coding block into four second coding blocks based on a quad-partitioning, the quad-partitioning being representative of a division type of dividing a coding block in both a vertical direction and a horizontal direction;
    dividing a second coding block into two third coding blocks based on a bi-partitioning, the bi-partitioning being representative of a division type of dividing a coding block in one of the vertical direction or the horizontal direction;
    acquiring syntax information in a level of a third coding block; and
    decoding the third coding block based on the syntax information,
    wherein the third coding block is divided into a plurality of partitions,
    wherein decoding the third coding block comprises:
    generating dequantized coefficients of the third coding block by performing dequantization for the third coding block; and
    generating a residual signal of the third coding block by performing inverse transform on the dequantized coefficients, and
    wherein the inverse transform for the third coding block is performed in units of the third coding blocks, not in units of the partitions included in the third coding block.

2. The video decoding method of claim 1, wherein decoding the third coding block comprises:
    acquiring coding information commonly applied to the partitions in the third coding block based on the syntax information;
    decoding one of the partitions based on the coding information; and
    decoding the other one of the partitions based on the same coding information as the one of the partitions.

3. The video decoding method of claim 2, wherein the coding information is acquired in units of the third coding blocks.

4. A video encoding method, comprising:
    dividing a first coding block into four second coding blocks based on a quad-partitioning, wherein the quad-partitioning refers to a division type of dividing a coding block in both a vertical direction and a horizontal direction;
    dividing a second coding block into two third coding blocks based on a bi-partitioning, wherein the bi-partitioning refers to a division type of dividing a coding block in one of the vertical direction or the horizontal direction; and
    generating a bitstream by encoding a third coding block,
    wherein syntax information is encoded into the bitstream in a level of the third coding block,
    wherein the third coding block is divided into a plurality of partitions,
    wherein encoding the third coding block comprises:
    performing transform on a residual signal of the third coding block; and
    performing quantization on the transformed residual signal, and
    wherein the transform for the third coding block is performed in units of the third coding blocks, not in units of the partitions included in the third coding block.

5. The video encoding method of claim 4, wherein coding information is encoded into the bitstream based on the syntax information, and
    wherein the coding information is commonly applied to the partitions in the third coding block.

6. The video encoding method of claim 5, wherein the coding information is encoded in units of the third coding blocks.

7. A transmission method of a video signal, comprising:
    dividing a first coding block into four second coding blocks based on a quad-partitioning, wherein the quad-partitioning refers to a division type of dividing a coding block in both a vertical direction and a horizontal direction;
    dividing a second coding block into two third coding blocks based on a bi-partitioning, wherein the bi-partitioning refers to a division type of dividing a coding block in one of the vertical direction or the horizontal direction;
    encoding a third coding block to generate a bitstream; and
    transmitting the bitstream including the video signal,
    wherein syntax information is encoded into the bitstream in a level of the third coding block,
    wherein the third coding block is divided into a plurality of partitions,
    wherein encoding the third coding block comprises:
    performing transform on a residual signal of the third coding block; and
    performing quantization on the transformed residual signal, and
    wherein the transform for the third coding block is performed in units of the third coding blocks, not in units of the partitions included in the third coding block.

8. The transmission method of claim 7, wherein coding information is encoded into the bitstream based on the syntax information, and
wherein the coding information is commonly applied to the partitions in the third coding block.

9. The transmission method of claim 8, wherein the coding information is encoded in units of the third coding blocks.

* * * * *